March 30, 1971 V. C. REES 3,573,019
LIQUID FLOW MEASURING PROCESS AND APPARATUS
Filed July 30, 1965 2 Sheets-Sheet 1

INVENTOR
VERNON C. REES
BY
*Stachin & Overman*
ATTORNEYS

March 30, 1971    V. C. REES    3,573,019
LIQUID FLOW MEASURING PROCESS AND APPARATUS
Filed July 30, 1965    2 Sheets-Sheet 2
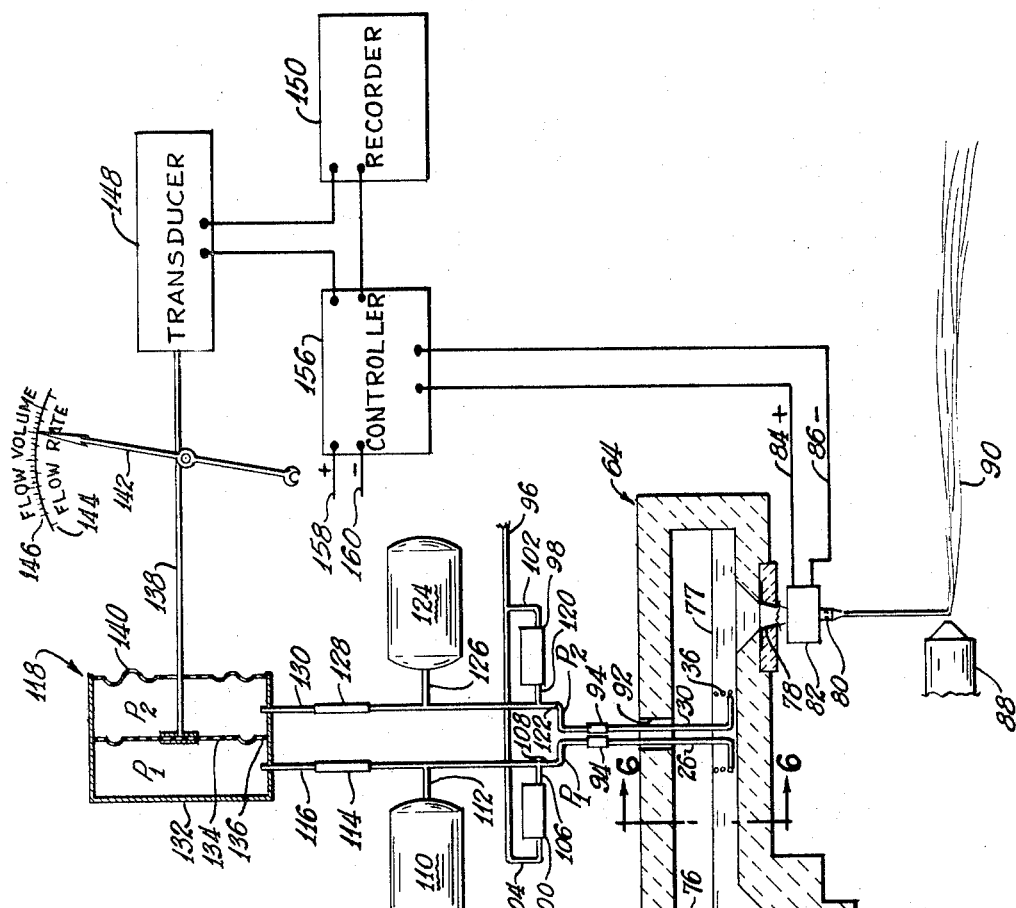
Fig. 5
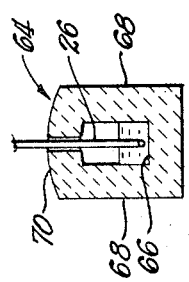
Fig. 6
INVENTOR.
VERNON C. REES
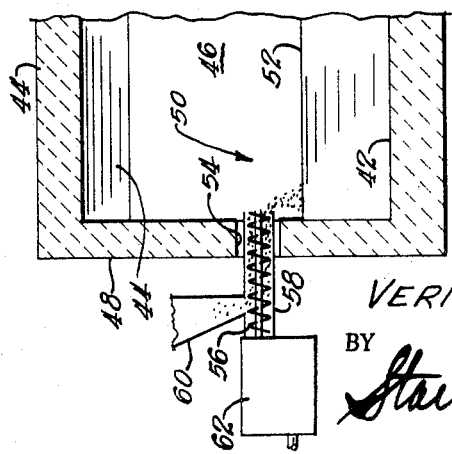
ATTORNEYS United States Patent Office 3,573,019
Patented Mar. 30, 1971

3,573,019
LIQUID FLOW MEASURING PROCESS AND APPARATUS
Vernon C. Rees, Newark, Ohio, assignor to Owens-Corning Fiberglas Corporation
Filed July 30, 1965, Ser. No. 476,124
Int. Cl. C03c; C03b
U.S. Cl. 65—29                                           8 Claims

ABSTRACT OF THE DISCLOSURE

Process and apparatus for measuring rate of flow of liquids through conduits, comprising immersed probes facing respectively against the direction of flow and in the direction of flow, with constant volumetric gas flow through each, as small discrete bubbles arising from a point beneath the surface of the liquid to the surface, whereby a differential pressure is produced that serves as a signal which can be extrapolated to volume of flow, and transduced for recording and control functions.

---

This invention relates to the measurement of flow of liquids.

More particularly, this invention relates to the measurement of flow rate of liquids through either open or closed conduits.

Still more particularly, this invention relates to process and apparatus for measuring rate of flow of liquids, and in turn converting the rate of flow into volume flow by using known constants of the liquid; and further converting rate of flow into control functions.

THE PROBLEM

In the production of wool fibers by the bulk attenuation of a molten glass stream using a high pressure jet of steam or the like as the attenuating medium, it is desirable that the flow of glass through the bushing (point of delivery) be kept constant. By so operating, the quality and production rate of fibers can be maintained at optimum levels.

There is no presently available system for determining actual volume of flow through the forehearth of a glass melting furnace to provide either a continuous or continual measuring or monitoring of the throughput.

Accordingly, a substantial advance to the art would be provided by a continuous flow monitoring device capable of producing a continuous signal related to throughput, which signal could be recorded and/or used to control a bushing in order to keep the throughput constant.

Also, a substantial advance to the art would be provided by novel process and apparatus for measuring the rate of flow of liquids through closed conduits.

It is accordingly an important object of the present invention to provide a novel process for measuring flow of liquids through conduits.

A further object is to provide novel apparatus for measuring flow of liquids through conduits.

A still further object is to provide novel process and apparatus for measuring liquid flow through open and closed conduits.

A further object is to provide a novel process and apparatus for measuring flow rate across the forehearth of a glass melting furnace and using the signal produced to maintain a constant flow through a glass forming bushing.

A still further object is to provide process and apparatus for measuring the rate of flow of liquids through closed conduits, and using the signal produced to govern the propulsion means for moving the liquid through the conduit and thereby maintain the flow constant.

Other objects of this invention will appear in the following description and appended claims, reference being had to the accompanying drawings forming a part of this specification wherein like reference characters designate corresponding parts in the several views.

FIG. 5 is a schematic view of a glas melting tank and forehearth feeding a wool fiber forming bushing, with associated mechanism, operated by the process and apparatus of the present invention, for maintaining the flow through the bushing constant, in the presence of changing factors of glass composition, glass temperature, glass viscosity and the like; and FIG. 6 is a sectional view taken along the line 6—6 of FIG. 5.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Broadly the present invention relates to the measurement of flow rate of a liquid through a conduit. The conduit can be open or closed. The liquid may be cold or hot, and of low viscosity or high viscosity. The liquid can be under pressure.

THE OPEN CONDUIT

Figure 1:
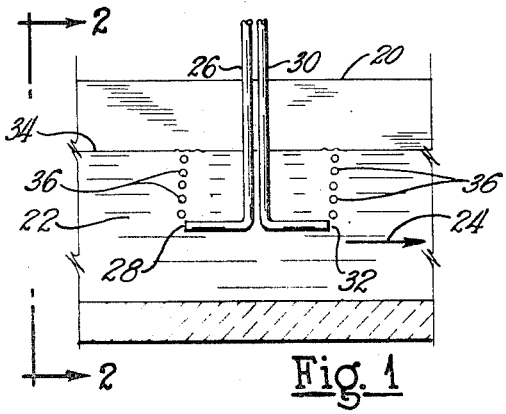
FIG. 1 is a longitudinal sectional view of the process and apparatus of the present invention as applied to the measurement of flow rate of a liquid passing through an open top conduit.

As shown in FIG. 1, an open top conduit 20 is used to convey a liquid 22 in a flow direction 24. The open top conduit 20 could represent the forehearth of a glass melting furnace, an open top trough, a canal, river or other. In short, an open top channel or conduit having a measurable cross-section at the point where measurement in accordance with the present invention is made, so that the system can be calibrated.

Here, the flow of liquid is provided by gravity, between the higher point to a relatively lower point.

A probe tube 26 has its outlet 28 facing upstream to the flow direction 24. A probe tube 30 has its outlet 32 facing downstream to the flow direction 24.

Each probe tube 26, 30 has its outlet 28, 32 submerged at a point in space, beneath the surface 34 of the liquid 22. Appropriate support mechanism, not shown, will be used to hold the tubes 26, 30 with the outlets 28, 32 in the same plane. It will be understood that such support mechanism can be adjustable so that the exact point of the outlets 28, 32 can be established with accuracy.

Separate, but equal constant volumes of gas are moved through each probe tube 26, 30 to flow from the outlets 28, 32. The gas issues from each outlet 28, 32 as a series of discrete bubbles 36 of a maximum dimension less than the distance between the outlets 28, 32 and the surface 34 of the flowing liquid 22. Thus, the bubble size is less than the point-to-surface distance.

The gas is passed through the probe tubes 26, 30 from a separate, constant volumetric flow device provided for each tube. The pressure may vary in accordance with any variation in the head of liquid above the submerged outlets 28, 32. However, this will have no effect on the present invention because both outlets 28, 32 are at the same level beneath the surface.

With the same, constant volume of gas provided to each probe tube 26, 30 a pressure differential will be produced that is a positive and accurate measure of the rate of flow of the liquid 22. This rate of flow can be converted to volume of flow or mass (weight) of flow past the measuring point represented by the outlets 28, 32, by using known constants.

Also, fluctuations of pressure in the atmosphere above the surface of the liquid will have no effect upon the differential rate of flow signal produced by the invention, since both outlets 28, 32 are at the same level beneath the surface 34 and accordingly will be equally effected. The constant flow through each outlet 28, 32 will result in the same differential between the probes so that a signal based entirely upon the flow rate is produced.

This pressure differential signal can be amplified and recorded by conventional means. Also, the pressure differential signal can be translated into flow volume by using known constants of temperature, viscosity of the liquid, size of conduit through which the liquid is flowing, etc. Further, as will become evident later, the pressure differential signal can be converted into a control function to control a valve or the like.

More specifically, the probe tube 26 which has its outlet 28 facing directly upstream will encounter a back pressure caused by the tendency of the flowing liquid to enter it. This will be added to the back pressure caused by the head of liquid above the submerged outlet 28.

The probe tube 30 will encounter a slightly reduced pressure caused by the flow 24 of liquid 22. The liquid will tend to pull the gas from the outlet 32 as it flows past, as contrasted to the opposite condition relative to the outlet 28.

The probe tube 30 will also encounter a back pressure caused by the head of liquid 22 above the outlet 32. This will balance off the corresponding back pressure encountered by the probe tube 26.

The ultimate effect will be a resultant pressure differential between the probe tubes 26 and 30. This resultant differential is a measure of flow rate and can be converted to flow volume and/or weight, as previously indicated.

THE CLOSED CONDUIT

Figure 3:
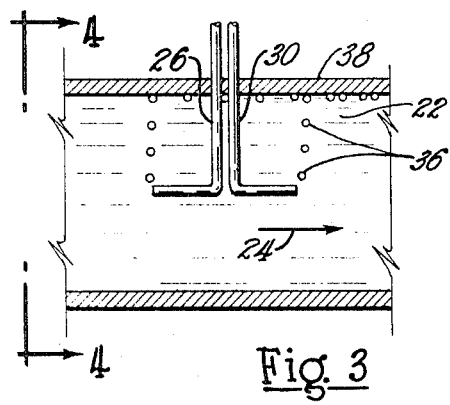
FIG. 3 is a longitudinal sectional view of the process and apparatus of the present invention as applied to the measurement of flow rate of a liquid passing through a closed conduit.
Figure 4:
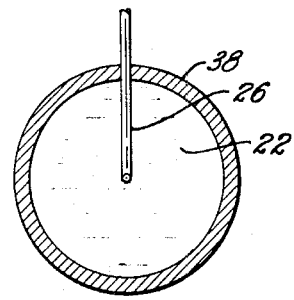
FIG. 4 is a transverse sectional view taken along the line 4—4 of FIG. 3.

As shown in FIGS. 3 and 4, a closed tubular conduit 38 is used to carry the liquid 22 in the flow direction 24. The extended scope of invention would include a closed conduit of any cross-section such as oval, multi-sided, such as square, or other; in short, a closed conduit for liquid.

A probe tube 26, 30 arrangement as in FIG. 1 is utilized. With the same constant volume of gas provided to each probe tube 26, 30 a resultant pressure differential will be provided.

Figure 2:
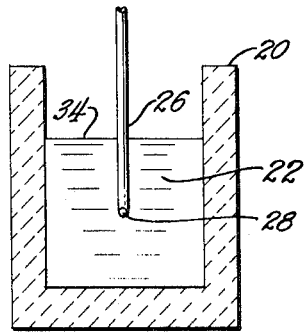
FIG. 2 is a transverse sectional view taken along the line 2—2 of FIG. 1.

In this aspect of the invention, the liquid 22 may be under superatmospheric pressure, as produced by a pump, as compared to the gravity flow of FIGS. 1 and 2 where atmospheric pressure or other was above the liquid level. Here it will be necessary that the gas emitted through the probe tubes 26, 30 be not only under sufficient pressure to overcome the pressure of the liquid 22 but also under enough additional pressure to produce constant flow of discrete bubbles 36 at a selected rate.

REFINED VERSION OF THE INVENTION: GLASS MELTING FURNACE

In FIGS. 5 and 6, there is an illustration of the manner in which the present invention can be applied for use with a glass melting furnace that is equipped with a forehearth. Molten glass flows from the melting zone of the furnace to and through the forehearth as a shallow layer, for delivery. In this particular illustration, the forehearth is shown as equipped with a delivery bushing for producing wool fibers by the jet attenuation method.

More particularly, by reference to FIG. 5, there is provided a glass melting furnace 40. This includes a refractory floor 42, a refractory roof arch 44, side walls 46, and end walls 48. The furnace 40 thus includes a melting zone 50 which contains a pool of molten glass 52.

The atmosphere above the pool of molten glass 52 is suitably gas fired. Alternately, electricity can be used to heat the pool of molten glass 52, by means of submerged electrodes, not shown. This forms a supply source as will become evident later.

The left hand furnace end wall 48 of FIG. 5 includes an opening 54 through which batch material is fed, to be melted within the melting zone 50. A screw feeder 56 is operably positioned within a conduit 58, connected with a feed hopper 60. Batch material is placed in the hopper 60 and is propelled by the screw feeder 56 through the opening 54 and into the melting zone 50. A variable speed drive 62 propels the screw feeder 56.

A suitable level control, not shown, can be utilized to drive the screw feeder 56 to supply batch material to the melting zone 50 as required, in order to keep the level constant therein. Such units are known in the art and are not here described, as not forming part of the present invention.

A forehearth 64 extends from the discharge end of the furnace, which is the right hand wall 48 of FIG. 5. This is opposite to the feed end where the screw feeder 56 is located, in order to give the molten glass a chance to become mixed and purified as it passes through the melting zone 50. Only one forehearth 64 is illustrated, for purposes of clarity. However, it is common practice for a single furnace to employ a plurality of forehearths. This invention is applicable to use with one or several forehearths. However, a separate sensing system of invention will be used with each forehearth.

In cross-section, the forehearth 64 is essentially an open top channel as shown in FIG. 6. Thus, the forehearth 64 includes a refractory bottom 66 and refractory side walls 68. A refractory roof arch 70 spans the side walls 68. Although the top appears covered by the roof arch 70, the forehearth is usually vented to the atmosphere by ports, not shown.

As shown in FIG. 5, a strainer block 72 is positioned within the mouth 74 of the forehearth 64. This forces the molten glass to pass underneath and holds back any floating particles that might contaminate the effluent glass. A roof block 76 is illustrated for the purpose of separating the atmosphere within the forehearth 64 from the atmosphere within the melting zone 50. This tends to render the atmosphere of the forehearth quiescent in the event of any fluctuations of the atmosphere of the melting zone 50, as by change in firing rate. Quiescent conditions in the forehearth contribute to greater accuracy of measurement and control.

The flow of glass through the forehearth 64 is effected by gravity and the pressure drop is illustrated by the slant of line 77, designating the surface of the glass within the forehearth 64. This is shown exaggerated for purposes of illustration.

At the outer end of the forehearth 64, the bottom 66 is provided with a feed bushing 78. This is suitably of circular configuration and includes a tip 80. The bushing 78 can be made of high temperature-resistant metal to withstand the molten glass.

For purposes of the present illustration, the bushing 78 is shown as having an annular heater 82, positioned in surrounding relationship to the tip 80. This annular heater 82 is illustrated as being electrically powered and the wires 84 and 86 provide a connection to a suitable resistance heating element contained within the heater 82.

A high pressure jet 8, as of steam or compressed air, is illustrated as being directed beneath and across the tip 80 of the bushing 78. As a molten glass stream issues from the tip 80, it is blasted into fibers 90 by the force of the jet 88.

THE PROBLEM REITERATED

Briefly, in review, the problem is this. Even though a a constant level be maintained in the melting zone 50 of the furnace 40, several changeable factors exist in the molten glass passing out of the melting zone and into the forehearth 64. These changeable factors will change the rate of flow of molten glass through the bushing 78. Thus the temperature of the bushing must be adjusted to compensate for the variations in order to keep flow through the bushing constant.

The changeable factors include changes of temperature, changes in glass composition, etc. More or less heat will have to be fed to the bushing heater 82 to compensate for these variations.

It is at this point that the invention comes into play. Therefore, all aspects of the invention will now be set forth in detail, including the invention will now be set forth in detail, including the manner in which the invention is applied to the fiber forming operation illustrated. It will however be evident that many other applications of the principles of the invention will become apparent to those skilled in the art.

THE INVENTION IN DETAIL

The forwardly and rearwardly facing probe tubes 26, 30 are exaggerated in size relative to the size of the forehearth shown in FIG. 5. Actually, they will be much smaller in proportion. However, this exaggerated relationship is shown for purposes of better illustrating this one particular application of the invention.

Reference may be made to FIG. 1 for an indication that the probe tubes 26, 30 are of tubular configuration and produce discrete bubbles 36 rising in succession to the surface of the liquid.

As pointed out before, the probe tubes 26, 30 are supported at a fixed point in space. Relative to FIG. 5, the probe tubes 26, 30 are shown as being passed down through a suitable hole 92 in the roof arch 70 of the forehearth 64. In order to withstand the effects of the molten glass, the probe tubes 26, 30 are made of temperature-resistant metal such as platinum alloy.

At a position outside of the roof arch 70 of the forehearth 64, as indicated at 94, the precious metal tubes 26, 30 can be connected to common metal tubing, such as copper. The common metal is satisfactory at the lower temperatures and reduces costs.

As mentioned above, relative to FIGS. 1–4, each probe 26, 30 is supplied with a constant volumetric flow of gas such as clean air. For this purpose, the clean gas is supplied from a suitable source to a feed line 96. The pressure of this clean gas is maintained at an appropriate level by a pressure regulator to provide gas at a pressure sufficient to meet all requirements. From the feed line 96, the clean gas flows through separate, constant flow regulators 98 and 100 by means of connecting lines 102 and 104. From the flow regulator 100 a constant volumetric flow of gas moves through line 106, thence through line 108 and out through the forwardly facing probe tube 26. The line 108 also connects to a surge tank 110 via line 112 and to a restricter 114. From the restricter 114, the gas passes through line 116 and into one side of a differential pressure detector cell 118.

The other probe tube 30 is suitably provided with its separate detector system. Thus, from the constant flow regulator 98, a constant volumetric flow of gas moves through branch line 120, thence through line 122 and out through the rearwardly facing probe tube 30. The line 122 also connects to a surge tank 124 by means of branch line 126 into a restricter 128. From the restricter 128, the gas passes through line 130 and into the other side of the differential pressure detector cell 118.

Before proceeding further, it is repeated that equal but separate constant volumetric flows are provided to each probe tube 26, 30. The pressure within the probe tubes 26, 30 may fluctuate, if the level of glass in the forehearth should change. However, the rate of volumetric flow will remain constant by virtue of the flow regulators 98 and 100.

Since pressure fluctuations are balanced between the probe tubes 26, 30 no net effect will be imparted to the differential pressure detector 118 and the signal produced by the detector will reflect flow rate only.

The purpose of the surge tanks 110, 124 and restrictors 114, 128 is to provide a damping and filtering action for smoothing out the bumps or pressure changes that occur as each bubble of gas is released from the immersed outlets 28, 32 of the probe tubes 26, 30. This prevents the differential pressure detector cell 118 from following each bump or pressure change. The result is that the differential pressure detector produces a substantially smooth line signal in contrast to an unmodulated signal of sine wave configuration that would be provided were the surge tank and filter system omitted.

This unit includes a closed housing 132 having a movable diaphragm 134 supported between flanges 136. The diaphragm 134 and flanges 136 are sealed to one another in gas-tight relation and the flanges are also sealed to housing 132 in gas-tight relation.

A signal pick-up arm 138 is connected at one end to the diaphragm 134 and extends out of the housing 132 through a flexible cover 140. A gas-tight seal is provided between the signal pick-up arm 138 and the flexible cover 140.

The signal pick-up arm is connected with a visual indicator gauge needle 142 that moves back and forth across a flow rate scale 144 and an extrapolated flow volume scale 146. Additionally, the signal pick-up arm 138 is connected to a transducer 148. By this arrangement, either flow rate or flow volume can be ascertained visually, and additionally, the signal is amplified by the transducer 148 for recording and control functions.

The extrapolated flow volume scale is established by using known factors of the liquid and the size of the conduit. In the case of glass, these would include glass density, temperature, viscosity and so forth.

It is to be understood that the transducer 148 is provided with a suitable power supply of its own in order to provide appropriate amplification to the signal from the signal pick-up arm 138.

A recorder 150 is connected to the transducer 148 by means of lines 152 and 154. The recorder 150 is also provided with its own power supply in order to convert the amplified signal from the transducer 148 into a permanent record.

As mentioned above, the amplified signal from the transducer 148 can be used to produce a control function. Thus, the amplified signal from the transducer 148 is fed to the controller 156 by means of lines 152 and 154. Here the transducer signal is imposed on the controller 156 to change a rheostat setting or other mechanism contained within the controller. The controller 156 is connected with incoming power lines 158 and 160. The output from the controller is fed through lines 84 and 86 to the heater 82 of the bushing 78 shown in the lower right hand corner of FIG. 5.

In the extended scope of the invention, the control loop from the differential pressure detector cell 118 through the transducer 148 to the recorder 150 and controller 156 can be either electric or pneumatic.

It will be evident that the recorder 150 and controller 156 can be combined into a single unit if desired.

OPERATIONAL SUMMARY

Separate, but equal and constant volumetric flow rates of gas are passed through the probe tubes 26, 30. These are discharged as successive, intermittent flow rate bubbles 36 which rise to the surface 77 of the layer of glass flowing through the forehearth. The bubbles 36 are discrete and have a maximum dimension less than the distance between the fixed point at which they are released, and the surface of the glass. Thus, the open ends of the immersed probes 26, 30 are never exposed to the atmosphere to provide large pressure drops.

A resultant pressure increase is developed in the forwardly facing probe tube 26 by the fact that it faces directly into the flowing liquid in the forehearth 64. A resultant pressure drop is developed in the probe tube 30 by the fact that it faces opposite to the probe tube 26, or exactly downstream of the flowing liquid in the forehearth 64.

A pressure differential signal is thus produced in the differential pressure detector cell 118, being translated into a substantially smooth function by the surge tanks 110, 124 and the restrictors 114, 128.

The resultant pressure differential signal is thereafter converted into flow rate, flow volume and a transduced signal for recording and control functions. The controller 156 adjusts the temperature level of the bushing heater 82 and thereby levels out the flow through the bushing 78 to a constant rate by compensating for any variations in temperature, viscosity, and composition of the glass flowing through the forehearth 64. It is to be understood of course that the probe tubes 26, 30 are placed within a conduit (the forehearth) which can be calibrated by calculation and measurement of the cross-sectional area at the point where the probe tubes are located.

PRACTICAL CONSIDERATIONS

In a particular embodiment of the present invention, the probe tubes 26, 30 comprise high temperature-resistant tubing of ¼" outside diameter and having a wall thickness of about .02". With the lower ends of the tubes 26, 30 immersed from about 1" to about 2" below the surface of the molten glass, clean air was delivered at a rate to form approximately 15 to 30 discrete bubbles per minute. The signal generation was therefore continual as a succession of intermittent pulses. The bubbles were of a diameter less than the distance from the outlets 28, 32 of the probe tubes 26, 30 to the surface of the glass so that the bubbles did not bridge the probe tip to surface distance.

Bubbles of this diameter are formed as the result of the relationship of molten glass viscosity, the small size of the probes and the low pressure at which the gas is supplied to the probe tubes.

SCOPE OF INVENTION

Although reference has been made to a probe tube of ¼" outside diameter with a .02" wall thickness, the invention is not to be specifically limited. Thus, a probe of ⅛" outside diameter tubing with .02" wall thickness also can be used. Further, a ⅜" outside diameter tube can be used.

BUBBLE RATE

It has been stated above under the heading The Open Conduit that the gas issues from each outlet 28, 32 of the probe tubes 26, 30 as a series of discrete bubbles 36 of a maximum dimension less than the distance between the outlets 28, 32 and the surface 34 of the flowing liquid 22. Thus, the bubble size is less than the point-to-surface distance.

To logically extend the concept of the present invention, it can be stated that the bubble rate is not to be limited. In actual runs, 15 to 30 bubbles per minute have worked extremely well. Further, actual tests have shown that from 1 to 150 bubbles per minute provide a broad operating range.

In its broadest aspects, the present concept is theoretically applicable to a single bubble hanging on or developed at the end of a probe tube, be it facing forwardly into the flow, rearwardly with the flow, or downwardly relative to the surface of the liquid. This is based on the fact that, for constant factors of head, draw down, etc., a given pressure will be required to produce the bubble under static conditions, i.e. conditions of no (zero) flow. Now, presume that pure flow is superimposed upon this set of constant factors. If the probe faces forwardly, the flowing liquid will tend to push the bubble back into the tube, providing an accurately measurable differential between the flow condition and static condition. This differential will represent pure flow.

If the probe faces in (along) the direction of liquid flow, the flowing liquid will tend to pull the bubble out and enlarge it. The bubble will be easier to form than under static conditions. There will be a differential between the pressure at static conditions to produce the bubble and flow conditions enlarging the bubble. The differential represents pure rate of flow.

Substantially the same condition is obtained with a downwardly facing probe. Flow will tend to pull the bubble out and enlarge it by flowing past the open end or tip of the probe tube. The pressure differential between static and dynamic conditions represents flow.

In view of the foregoing, the principles of the present invention are not to be limited relative to the bubble rate, so long as maximum bubble size is less than probe tip to surface distance.

When other liquids of substantially differing viscosity from glass are measured, bubble rates appropriate to the measurement will become apparent through practical application studies of the invention.

PROBE TUBE OUTLET DEPTH

Probe tube outlet immersion depths in the range from about 1" to about 2" have been successfully utilized in applying the present invention to the measurement of glass flow. This clearly demonstrates the versatility of the invention for measuring shallow glass flow conditions as in the forehearth of a furnace. However, measurements in deeper flow zones can be made with a high degree of accuracy, utilizing a greater immersion depth if desired.

PROBE OUTLETS, NUMBER AND ORIENTATION

The present invention has been illustrated as using two probe outlets, one facing directly into or confronting the flow of liquid and the other facing directly with (along) the flow. Within the extended scope of the invention, a different angularity of orientation can be used, with application of a correction factor, if necessary, to the resultant signal.

In a further logical extension of the invention, a single probe can be used. Two probes have been illustrated and discussed as being used in one practical embodiment of the invention. A substantial pressure differential is produced by so operating, so that the control equipment is not required to be of computer accurate precision. Thus the expense is reduced to a reasonable level in practical applications.

However, the invention is applicable to use with a single probe where head (including atmosphere), draw down, etc., are considered to be constant factors.

For purposes of illustration, consideration will be given to a single probe having the outlet facing into the flow of liquid. Under static conditions (no flow, and all other factors constant), a given pressure of gas within the probe will be required to produce a bubble. Presume that this bubble hangs on the end of the probe. Now, when pure flow is imposed, the bubble will encounter a resistance against its formation. The pressure required to produce the bubble will be higher. The difference between the lower pressure to produce the bubble under static conditions, and the higher pressure to produce the bubble under dynamic (flow) conditions will yield a differential ($d$). This differential ($d$) will be a pure flow signal.

This principle also can be extended to a probe tip oriented in the direction of flow, under which condition, the pull of flow will make the bubble easier to form. This will cause the bubble to enlarge and will lower the required pressure for its formation to the same size. Thus, the difference between the higher pressure to form the bubble under static conditions and the lower pressure to form the bubble under dynamic (flow) conditions will produce a flow differential (d).

With a probe tip extending straight down into the liquid from the surface, the same principle would apply. The bubble will be pulled out of the probe tip and enlarged by the flow of liquid. A flow signal (d) will result from the pressure differential.

In view of the foregoing, it is believed that no restriction need be placed on the probe tip orientation and that the invention clearly encompasses the use of a single probe.

In its broad aspects, it can be stated that the back pressure of the gas within the probe tube as modified by the pressure exerted by the liquid flowing past the tip will provide a signal (d) representing pure rate of flow of liquid.

The invention also can be stated as follows: A gas outlet orifice facing and emitting bubbles toward the upstream direction of flow would be opposed by the confronting liquid flow forces. Accordingly, the back pressure measured in the probe would be dependent upon the rate of liquid flow toward the outlet. Conversely, a probe outlet facing downstream of the liquid flow path would have less back pressure and this will vary with the rate of liquid flow past the outlet. Either one or a combination of both of these probe arrangements is adapted to indicate the rate of flow in a stream in accordance with the broad aspects of the present invention.

In a practical aspect of the invention, it is logical to apply the principles to indicate the flow rate of glass in a stream such as in the forehearth of a melting furnace and provide a signal to a computer to permit regulation of variables of the melting operation.

CONTROL FUNCTION

By the present invention, the broad principle of flow rate measurement is to be encompassed. The pressure differential signal reflecting rate of flow can be developed into a control signal to control a valve (glass forming bushing) or control the speed of a pump.

Inherent in the present invention is also the establishment of a selected flow rate. Thus, the flow indicator needle can be moved to a certain setting. This will cause the pump or valve to establish a flow rate to match that setting. When the setting is reached, the system will stabilize at that setting.

In a logical extension of the present invention, not only the outflow of a liquid can be controlled as has been described hereinbefore, but also the input of liquid to a system can be controlled.

By this aspect of the invention, the rate of flow of a liquid through a conduit is ascertained by means of the resulting pressure differential developed in accordance with the present invention. The signal so produced is utilized to control the input to the supply vessel in order to maintain the level constant therein. With this level retained constant, and the output end of the conduit retained unrestricted, a constant pressure drop is established. Thus, the flow rate through the conduit will be retained constant.

In a further, logical extension of the present invention, not only the outflow and inflow of a liquid can be controlled, but also the composition of a liquid in a system can be controlled. Thus, a liquid having a composition-sensitive viscosity at a constant temperature can have the composition controlled. Thus, a thermocouple is employed in the system to activate an appropriate mechanism for maintaining the temperature of the liquid constant. Thereafter, based on the rate of flow of the liquid through a conduit, restriction or other, a resultant pressure differential signal is developed. This signal is used to proportion the feed of viscosity-influencing ingredient into the liquid so that the viscosity, at constant temperature, and thus the composition of the liquid is controlled.

I claim:
1. In a process of measuring rate of flow of a liquid through a conduit, the steps of
 bubbling a first constant flow volume stream of gas into the flowing liquid at a submerged level within the liquid,
 releasing said first stream of gas in direct opposition to the direction of flow of the liquid,
 bubbling a second constant flow volume stream of gas into the flowing liquid at said submerged level,
 releasing said second stream of gas in the direction of flow of the liquid,
 maintaining the volume rate of flow of said streams constant and equal at a pressure sufficient to overcome the back pressure imposed by the head of liquid above said submerged level,
 and bubbling each of said streams of gas at a bubble rate to discharge as a series of discrete bubbles of a maximum dimension less than the submerged level-to-surface dimension,
 whereby the flow of liquid produces a resultant back pressure differential between the two streams of gas that is an accurate measure of the rate of flow of said liquid through said open-top conduit.

2. In a method of measuring the rate of flow of molten glass through the forehearth of a melting furnace, the steps of
 bubbling a first constant flow volume stream of gas into the molten glass flowing through the forehearth at a submerged level within the flowing glass,
 directing said first stream of gas against the direction of flow of the liquid,
 bubbling a second constant flow volume stream of gas into the flowing liquid at said same submerged level,
 and directing said second stream of gas into the direction of flow of the molten glass,
 whereby the flowing glass produces a resultant pressure differential between the two streams of gas, accurately reflecting rate of flow of the molten glass through the forehearth.

3. In a process of keeping constant the rate of flow of molten glass across the forehearth of a melting furnace wherein the viscosity of the glass influences volume of flow through a forming bushing, wherein the level of molten glass within the furnace is maintained substantially constant to provide a constant pressure drop across the forehearth, and wherein the bushing is heated in accordance with the viscosity of the effluent glass to alter throughput, the steps of
 bubbling a first constant flow volume stream of gas into the glass flowing across the forehearth at a submerged level within the glass,
 directing said stream against the direction of flow of the glass,
 bubbling a second constant flow volume stream of gas into the molten glass flowing across the forehearth at said submerged level,
 directing said second stream in line and along with the direction of flow of the molten glass,
 bubbling each of said streams of gas as a series of discrete bubbles of a maximum dimension less than the distance between said submerged level and the surface of the flowing glass,
 converting the resultant differential back pressure produced between the streams by the flow of molten glass, representing rate of flow, into a signal,
 converting said signal into a control function,
 and imposing said control function onto said bushing to adjust the heat setting of said bushing to alter the viscosity of the effluent glass in a manner to keep the throughput constant, and thus the flow rate across the forehearth constant.

4. In a process of maintaining rate of flow constant of a liquid under pressure through a closed conduit, the pressure being established by a variable volume pump means, the steps of bubbling a first constant flow volume stream of gas into the flowing liquid at a submerged level within the liquid, directing said stream against the flow of the liquid, bubbling a second constant flow volume stream of gas into the flowing liquid at said submerged level, releasing said second stream in the direction of flow of the liquid, maintaining the volume rate of flow of said streams constant and equal at a pressure sufficient to overcome the back pressure imparted by the pressure of said liquid and by the head of said liquid above said submerged level, maintaining the volume rate of flow of said streams at a level to discharge as a series of discrete bubbles rising to the surface of said liquid, converting the resultant differential back pressure between the streams of gas, representing the rate of flow, into a signal, converting said signal into a control function, and imposing said control function onto said variable volume pump to alter the setting of said pump in a manner to keep flow rate constant through said conduit.

5. In a process of keeping constant the rate of flow of molten glass across the forehearth of a melting furnace, wherein the viscosity of the glass influences volume of flow out of the forehearth, and wherein the level of molten glass within the furnace is maintained substantially constant to provide a constant pressure drop across the forehearth, with constant volume flow out of the forehearth, the steps of bubbling a first constant flow volume stream of gas into the molten glass flowing across the forehearth at a submerged level within said flowing glass, directing said first stream of gas countercurrent to the direction of flow of the flowing glass, bubbling a second constant flow volume stream of gas into the molten glass flowing across the forehearth at said submerged level, directing said second stream of gas in line and along with the direction of flow of the flowing glass, bubbling each of said streams of gas as a series of discrete bubbles of a maximum dimension less than the distance between the submerged level and the surface of the flowing glass, converting the resultant differential back pressure between the streams of gas caused by flow of said liquid, representing rate of flow, into a signal, and adjusting the temperature of said glass within the forehearth in accordance with said signal, to thereby retain viscosity constant, and keep the flow rate constant across the forehearth, between said constant head in the furnace and the lower discharge point of the forehearth, and thus the throughput out of the forehearth constant.

6. In a process of controlling the composition of a flowing liquid that has a composition-sensitive viscosity at constant temperature, the steps of flowing the liquid across a restriction from a constant head supply to a point of discharge while retaining the temperature of the flowing liquid constant, bubbling a first constant flow volume stream of gas into the liquid flowing across said restriction, at a level below the surface of said liquid, directing said first stream of gas countercurrent to the direction of flow of the liquid, bubbling a second constant flow volume stream of gas into the liquid flowing across said restriction at said submerged level, directing said second stream of gas in line with the direction of flow of said liquid, bubbling said streams of gas as a series of discrete bubbles of maximum dimension less than the distance between said submerged level and the surface of the flowing liquid, converting the resultant differential back pressure between the streams of gas caused by flow of said liquid, representing rate of flow, into a signal, and adjusting the composition of said liquid to thereby retain viscosity constant at said temperature and keep the rate of flow constant across said restriction between said constant head source and said point of discharge and thus the throughput across the restriction constant.

7. In apparatus for measuring flow rate of a liquid flowing across a restriction, a first tube having an outlet positioned below the level of liquid flowing across said restriction, said outlet of said first tube being oriented against the direction of flow of liquid across said restriction, a second tube having an outlet positioned below the level of liquid flowing across said restriction, said outlet of said second tube being oriented in the direction of flow of liquid across said restriction and being at the same level as said outlet of said first tube, supply means for supplying equal, separate constant flow volumes of gas through each of said tubes to emerge as a series of discrete bubbles of a maximum dimension less than the distance between said outlets and the level of liquid, and means for detecting the resultant back pressure differential imposed on said tubes by said flowing liquid, said back pressure differential representing rate of flow of said liquid across said restriction.

8. In apparatus for feeding molten glass at a constant volume, wherein the viscosity of the glass influences volume of flow, a melting furnace, level control means for maintaining the level of molten glass within said furnace constant, a forehearth connected to said furnace to receive glass flowing from the furnace, a bushing connected to said forehearth to feed molten glass out of said forehearth at a point spaced from said furnace and below the constant level of the furnace, means for heating said bushing in accordance with the viscosity of glass flowing therethrough, a first tube having an outlet positioned below the level of molten glass flowing across the forehearth, said outlet of said first tube being oriented to face against the direction of flow of the molten glass, a second tube having an outlet positioned at the same depth as said outlet of said first tube and being oriented to face in the direction of flow of said molten glass, means for supplying equal, separate, constant flow volumes of gas through each of said tubes at a pressure sufficient to overcome the back pressure imposed by the head of glass, and issue as a series of discrete bubbles of a maximum dimension less than the distance between said outlets of said tubes and the surface of the molten glass, detector means connected to said tubes to detect the resultant back pressure differential imposed on said tubes by said flowing glass, representing rate of flow of the molten glass across the forehearth, transducer means connected to said detector means to convert said resultant back pressure differential into a control function, and control means connected to said transducer means and to said bushing to adjust the heat of said bushing to alter the viscosity of the glass in a manner to keep the throughput of the bushing constant and thereby keep the flow rate across the forehearth constant.

References Cited

UNITED STATES PATENTS

| | | | |
|---|---|---|---|
| 1,977,969 | 10/1934 | McIntosh | 65—160 |
| 2,706,409 | 4/1955 | Preston | 73—212 |
| 3,218,138 | 11/1965 | Mennerich | 65—162 |
| 3,380,463 | 4/1968 | Trethewey | 65—161 |

FRANK W. MIGA, Primary Examiner

U.S. Cl. X.R.

65—160, 164, 158; 73—212